(12) United States Patent
Drevet

(10) Patent No.: US 9,683,538 B2
(45) Date of Patent: Jun. 20, 2017

(54) FLUID ENERGY GENERATOR

(75) Inventor: Jean Baptiste Drevet, Paris (FR)

(73) Assignee: EEL ENERGY, Paris (FR)

( * ) Notice: Subject to any disclaimer, the term of this patent is extended or adjusted under 35 U.S.C. 154(b) by 708 days.

(21) Appl. No.: 14/004,369

(22) PCT Filed: Mar. 13, 2012

(86) PCT No.: PCT/EP2012/054405
§ 371 (c)(1),
(2), (4) Date: Oct. 4, 2013

(87) PCT Pub. No.: WO2012/123465
PCT Pub. Date: Sep. 20, 2012

(65) Prior Publication Data
US 2014/0023481 A1    Jan. 23, 2014

(30) Foreign Application Priority Data

Mar. 14, 2011 (FR) ..................... 11 52067

(51) Int. Cl.
| F03B 13/00 | (2006.01) |
| F03B 5/00 | (2006.01) |
| F03D 13/20 | (2016.01) |

(52) U.S. Cl.
CPC ............ *F03B 5/00* (2013.01); *F03D 13/20* (2016.05); *F05B 2240/941* (2013.01);
(Continued)

(58) Field of Classification Search
CPC ............ F03B 5/00; F03B 13/20; F03D 11/04; H02N 2/185; F05B 2240/941; Y02E 10/28; Y02E 10/38; Y02E 10/728
See application file for complete search history.

(56) References Cited

U.S. PATENT DOCUMENTS 7,626,281 B2 *  12/2009  Kawai ................. F03D 5/06
                                                    290/1 R
2008/0297119 A1  12/2008  Frayne
(Continued)

FOREIGN PATENT DOCUMENTS

CA      2 675 947 A1   2/2011
WO      WO 82/00321    2/1982
(Continued)

*Primary Examiner* — Dwayne J White
*Assistant Examiner* — Kayla McCaffrey
(74) *Attorney, Agent, or Firm* — Muncy, Geissler, Olds & Lowe, P.C.

(57) ABSTRACT

A device for recovering energy from a flow of fluid including a support, a flexible membrane, an attachment system for attaching at least a first area of the membrane connecting this first area of the membrane to the support; force transmission means connected to a second area of the membrane remote from the first membrane area, this second area of the membrane being movable with respect to the support. The device includes separation limiting means, adapted to limit the separation of the first area of the membrane from at least a first point of the attachment system and to limit the separation of the second area of the membrane from a second point of the attachment system, these separation limiting means being such that the first and second areas are spaced apart from each other by a minimum distance (Dmin) smaller than the shortest length (Lmin) separating these first and second areas measured along a face of the membrane.

18 Claims, 8 Drawing Sheets

(52) U.S. Cl.
CPC ............... *Y02E 10/28* (2013.01); *Y02E 10/38* (2013.01); *Y02E 10/728* (2013.01)

(56) References Cited

U.S. PATENT DOCUMENTS

2010/0078941 A1* 4/2010 Filardo ................. F03B 13/188
  290/52
2011/0006532 A1* 1/2011 Grey ..................... F03B 13/148
  290/53

FOREIGN PATENT DOCUMENTS

| WO | WO 2008/066553 A1 | 6/2008 |
| WO | WO2010/012888 A2 * | 2/2010 |
| WO | WO 2010/012888 A2 | 2/2010 |

* cited by examiner

FLUID ENERGY GENERATOR

The invention relates to the field of devices for recovering energy from a flow of fluid.

In particular, the invention relates to a device for recovering energy from a flow of fluid including:
- a support;
- a flexible membrane;
- a system for attaching at least a first area of the membrane, connecting this first area of the membrane to the support;
- force transmission means connected to a second area of the membrane remote from the first area of the membrane, this second area of the membrane being movable with respect to the support.

Devices of this type are used to recover energy from a fluid flow such as air or water, and to transmit this recovered energy in the form of mechanical energy (that is to say, a force associated with a movement or a velocity) toward another member such as a converter adapted to convert the transmitted mechanical energy to electrical energy.

Patent document WO82/00321 discloses an energy recovery device of the aforesaid type. This prior art device is a wind power generator including an air conduit formed by two cheeks between which a membrane is kept stretched in a direction lying on the plane of the membrane and perpendicular to the direction of the air flow. The membrane becomes the medium for a transverse vibration, under the action of the wind, and the transverse movement of the central part of the membrane is then used to drive an electricity generating device.

In view of the investment required to install energy recovery devices in flows, notably in a marine environment, it is desirable to consider alternative solutions which, at least in certain conditions, allow the energy capture performance to be improved in a given flow.

OBJECT OF THE INVENTION

The object of the invention is an energy recovery device according to the generic definition given above, which allows improved energy recovery performance to be achieved, at least in certain types of flow.

BRIEF DESCRIPTION OF THE INVENTION

In order to achieve this object, the invention relates primarily to a device for recovering energy from a flow of fluid including:
- a support;
- a flexible membrane;
- a system for attaching at least a first area of the membrane, connecting this first area of the membrane to the support;
- an energy converter;
- force transmission means connected to a second area of the membrane remote from the first area of the membrane, this second area of the membrane being movable with respect to the support, these force transmission means being arranged to transmit mechanical energy from the second area toward the energy converter.

This device according to the invention is essentially characterized in that it includes separation limiting means, adapted to limit the separation of the first area of the membrane from at least a first point of the attachment system and to limit the separation of the second area of the membrane from a second point of the attachment system, these separation limiting means being such that the first and second areas are spaced apart from each other by a minimum distance smaller than the shortest length separating these first and second areas measured along a face of the membrane, these separation limiting means thus promoting an undulatory movement of the membrane when the latter is placed in said fluid flow.

As a general rule, the minimum distance by which the first and second areas are spaced apart is the shortest distance measured along a straight line extending between these first and second areas when they are separated from each other with the separation limiting means limiting this separation between the first and second areas.

Similarly, the shortest length separating the first and second areas, measured along a face of the membrane, is the shortest length that can be measured between these first and second areas while following the face of the membrane. Typically, this shortest length corresponds to the developed length of the curve of intersection between:
- a longitudinal sectional plane of the membrane passing through the first and second areas; and
- the face of the membrane along which the measurement is made.

Thus, according to the invention, the membrane has a developed length greater than the distance separating the first and second areas, such that this membrane is not stretched between these first and second areas.

Thus, when the membrane is placed at rest or in a fluid flow, it is curved along at least a portion of its length located between its first and second areas.

This bending or curvature of the membrane is present because, owing to the separation limiting means, the developed length of the membrane is greater than the minimum distance separating the first and second areas of the membrane.

In operation, when the device is immersed in a fluid flow with a given flow velocity Vf, the flexible membrane, which is curved (because it is not stretched) is made to move in an undulatory fashion and the separation limiting means limit the separation between the first and second areas of the membrane, in such a way that the membrane cannot be stretched out straight along the whole of its length. The membrane resists the flow at least as long as this flow does not exceed a limiting velocity.

This is because, when the membrane is subjected to the flow forces of the fluid stream, the latter creates excess pressure on the incident side of each of the curves of the membrane with respect to the flow, and an underpressure on the opposite side, on the inner side of each of these curves. This pressure difference tends, on the one hand, to cause the deformation of the membrane in the direction of the fluid stream, and, on the other hand, for the same position, to deform the curved portion until the curvature of the membrane at this point becomes inverted. Thus, under the effect of the fluid stream, the membrane undulates in an alternating, quasi-sinusoidal shape. This forced undulation of the membrane is propagated and reinforced from the first area toward the second area of the membrane at a velocity Vm.

It has been found that, when the device is immersed in the fluid flow from which energy is to be taken, the membrane undulates and its second area, called the downstream area, is made to move with a motion changing alternately from one to the other side of a flow axis passing through the first and/or the second point of the attachment system.

It has been found that the multiplicity of the curvatures and therefore of wavefronts multiplies the energy capture capacity. Furthermore, the membrane perturbs a fluid stream having a cross section greater than the cross section representing the width of the membrane multiplied by the amplitude of the wave, and therefore it captures energy from the fluid in a space considerably larger than its overall dimensions.

Since the force transmission means are connected to this second area of the membrane, the resultant of the forces of the fluid can be captured over the whole of the membrane, and thus energy can be extracted from the fluid flow.

It should be noted that the first and second points of the attachment system may be distinct or combined with each other. These first and second points are provided in order to allow at least a part of the limiting means to pivot with respect to the attachment system.

To aid the understanding of the invention, the term "membrane at rest" denotes a state in which the membrane is not subject to the fluid flow and is subject to the Earth's gravity and to the limiting means. Because of the limiting means which limit the separation of the first and second areas of the membrane with respect to points of the attachment system, it has been found that, particularly when the membrane is at rest, the membrane is deflected, being curved under the effects of gravity (see FIGS. 4 and 5) and of the limiting means, at least in part of the membrane located between its first and second areas.

In order to use the device according to the invention, the separation limiting means are preferably made to be such that the first and second areas are spaced apart from each other by a minimum distance of less than 95% of the shortest length separating these first and second areas measured along a face of the membrane.

It has been noted that the energy capture performance of the device according to the invention improves when the first and second areas are spaced apart from each other by a minimum distance of less than 95% of the length separating the first and second areas measured along a face of the membrane. This is because, when the difference between:

the minimum distance of the length of membrane measured between the first and second areas of the membrane, and the minimum developed distance of this membrane measured between these first and second areas is increased up to a certain point, it is found that the amplitude of the waves formed by the membrane subjected to the flow tends to increase.

For any given flow, the amount of energy recovered depends on this amplitude.

It has been noted that the energy capture performance of the device increases as a result of the fact that the undulation of the membrane is forced by the separation limiting means which define a parameter influencing the undulation velocity of the membrane when subjected to a given fluid velocity. In particular, it has been found that, as a result of the invention, a ratio of fluid velocity Vf to membrane wave velocity Vm is obtained which remains substantially constant over a given range of fluid velocity.

This ratio depends on the separation of the first and second areas, which is adjusted by the separation limiting means, and on the reaction force of the energy converter and the mechanical characteristics of the membrane.

Preferably, it is arranged that this ratio is adjusted to ⅓ to maximize the energy capture from the flow.

It has also been noted that, in order to improve the performance of the device, the separation limiting means and the attachment system are such that the membrane edge located opposite the attachment system can oscillate at a distance from the first and second points of the attachment system.

BRIEF DESCRIPTION OF THE DRAWINGS

Other characteristics and advantages of the invention will become clear in the light of the description which is provided below for guidance only and in an entirely non-limiting way, with reference to the attached drawings, in which:

FIG. 11 shows an embodiment of the device according to the invention in which the support 3 is connected to means for positioning the device in its environment which are buoyant 25a;

Figure 19:
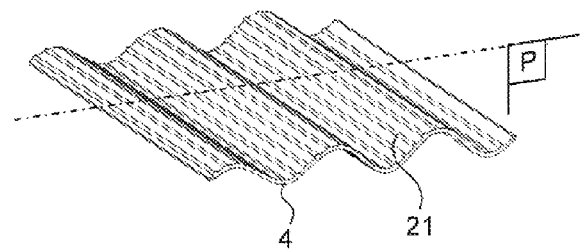
FIG. 19 shows a membrane including transverse ridges 21 for forming limitations to the fluid flow along the membrane and for creating initiation points of longitudinal undulations of the membrane.
Figure 20:
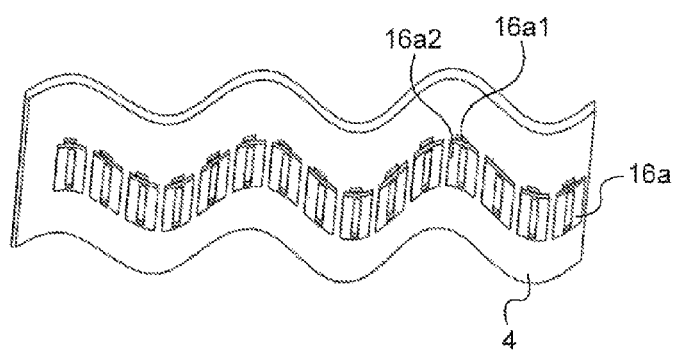
FIG. 20 shows a membrane fitted with on-board converters of a first type 16a, known as converters operating by translation of magnets relative to coils.
Figure 21:
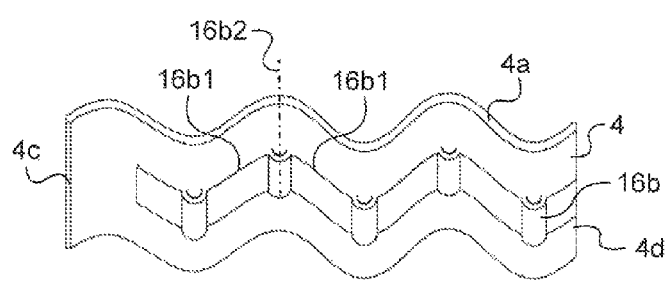
FIG. 21 shows a membrane fitted with on-board converters of a second type 16b, known as rotary converters, including a plurality rotary generators interconnected to capture energy from waves of longitudinal deformation of the membrane.

The following description gives details of different embodiments of the device according to the invention 1 (FIGS. 1-12, 25a, 25b and 26) and different embodiments of membranes and/or means of limiting the separation of areas of these membranes (FIGS. 13-19) and two embodiments of on-board converters on membranes (FIGS. 20 and 21). It should be noted that each of the elements of FIGS. 13 to 21 can be combined with any of the embodiments of devices according to the invention described in FIGS. 1-12, 25a, 25b, 26.

In the following description, the flowing fluid concerned is a liquid such as water, and the device 1 is a fluid power generator designed to recover mechanical energy from the fluid flow and to generate electricity with the aid of a converter 14.

The device 1 of FIGS. 1 to 12 includes:
- a support 3;
- a flexible membrane 4 having a developed length Lmin; and
- a system 5 for attaching the membrane, connecting a first area 6 of the membrane to the support 3.

The purpose of this attachment system 5 is to provide a deformable assembly connecting a first membrane area 6 to a part of the attachment system which is fixed to the support 3, this part being, in the present case, the part of the attachment system which is fixed with respect to the support 3.

The attachment system 5 includes two links 5a, 5b which are attached, on the one hand, to the first area 6 of the membrane 4, and, on the other hand, to the part of the attachment system which is fixed to the support.

These links 5a, 5b of the attachment system pre-position the first area of the membrane with respect to the support, while permitting the relative movement of this first area with respect to the support.

A flexible link 5a, 5b may include cables allowing the adjustment of the separation of the first area 6 of the membrane from the part of the attachment means 5 which is fixed relative to the support 3.

Figure 12:
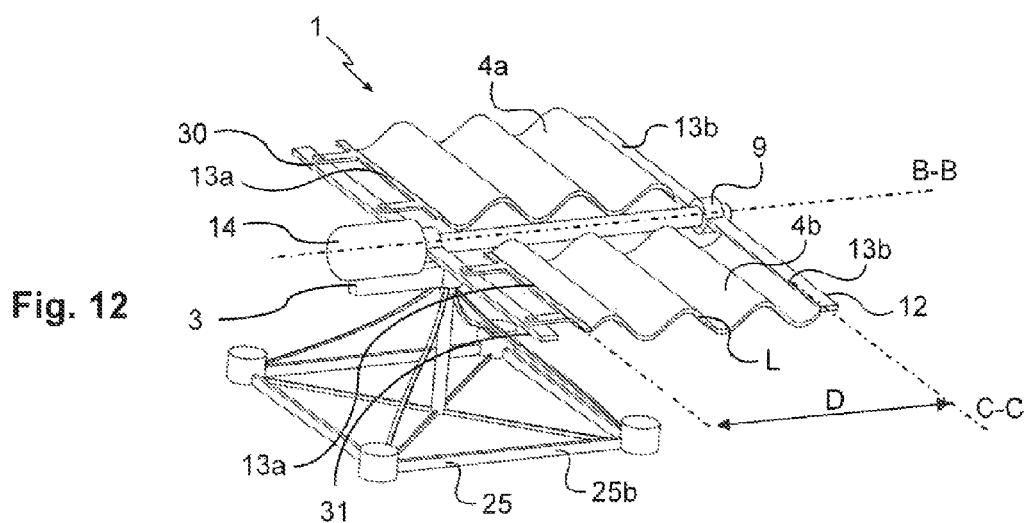
FIG. 12 shows an alternative embodiment of the device according to the invention including two oscillating membranes 4a, 4b around an axis of the support B-B carrying a rotary converter 14 whose natural axis of rotation coincides with the axis of the support B-B.
Figure 13:
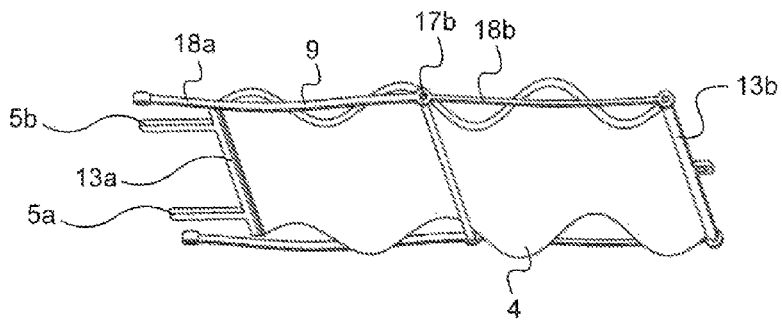
FIG. 13 shows a portion of the device according to the invention used to apply the invention in its embodiments shown in FIGS. 7 and 8, the membrane being connected to its separation limiting means by its first and second areas and by intermediate points of attachment of the membrane placed between the first and second areas of the membrane.

As can be seen in the embodiments shown in FIGS. 12 and 13, the attachment system 5 may include a link bar 13a, called the upstream link bar 13a. This upstream link bar 13a is connected permanently to the membrane in the first membrane area which, in the present case, is located along the upstream edge 4c of the membrane.

The device further includes separation limiting means 9 which are also formed by flexible links and have the function of:
- limiting the relative separation of the first membrane area 6 from a point on the first point 10 of the attachment system which is preferably fixed with respect to the support 3;

limiting the separation of a second membrane area 8 relative to a second point 11 of the attachment system which is preferably fixed with respect to the support; and limiting the spacing of the first and second areas 6, 8 of the membrane with respect to each other, in such a way that the membrane, when at rest, is curved between its first and second areas.

It should be noted that the fixed part of the attachment system 5 carries the first and second points 10, 11, with respect to which the distances separating the first and second areas of the membrane 6, 8 are limited.

The limiting means bring the first and second areas 6, 8 toward each other in such a way that the minimum distance Dmin measured between these areas 6, 8 is smaller than the minimum membrane length Lmin measured along a face 4e of the membrane (in other words, the developed length of the membrane) between these areas 6, 8.

Dmin is at least less than 95% of Lmin and is preferably less than one half of Lmin.

It has been noted that the energy capture performance of the device according to the invention improves when the first and second areas are spaced apart from each other by a minimum distance Dmin of less than 95% of Lmin.

Thus the membrane is forced to curve between the first and second areas 6, 8, and is forced to undulate when immersed in a fluid flow.

By fixing the dimensions Dmin and Lmin, it is possible to set the parameters of the undulatory movement of the membrane in a flow (maximum amplitude, maximum wavelength, frequency and ratio between the velocity of the fluid in the flow Vf and the velocity of the membrane wave Vm).

In order to limit these dimensions Dmin and Lmin, stretched cables are used, these cables forming at least a part of the limiting means.

The first membrane area 6 extends across the whole width Larg of the membrane along an upstream transverse edge 4c of the membrane, perpendicularly to a longitudinal sectional plane P of the membrane. This first area 6 is limited in its width by the projection, in the plane P and in a direction of projection perpendicular to this plane P, of the junction or junctions of the membrane with the membrane attachment means which are nearest to the edge of the membrane intended to be placed in an upstream position in the flow 2.

The second membrane area 8 extends across the whole width Larg of the membrane along a downstream edge 4d of the membrane. This second area 8 extends in length across the whole width Larg of the membrane, perpendicularly to the longitudinal sectional plane P of the membrane 6. This second area 8 is limited in its width by the projection, in the plane P and in the direction of projection perpendicular to this plane P, of the junction or junctions of the membrane with the force transmission means 12. If these force transmission means 12 include a link bar 13b called the downstream bar (this bar 13b is described in detail below), then the width of this second area is the greatest width of the surface of the bar 13b in contact with the membrane 6.

The upstream edge 4c is an edge intended to be placed in the fluid flow upstream of the downstream edge 4d. The downstream edge 4d is the membrane edge which is nearest to the link between the membrane and the transmission means 12. Consequently, this downstream edge 4d is nearer to the second area 8 than it is to the first area 6, while the opposite is true of the upstream edge 4c. The upstream edge 4c is a membrane edge at the opposite and of the membrane from the downstream edge 4d.

As can be seen in all of FIGS. 1 to 21, the membrane 4 is normally formed from a single piece having a closed perimeter in which the first and second areas 6, 8 are located. However, although this is not shown in the drawings, the membrane may also be formed from a plurality of rigid panels hinged to each other along panel hinge axes perpendicular to the longitudinal sectional plane P of the membrane (this longitudinal sectional plane P is a plane passing through the first and second areas and cutting through the thickness of the membrane). Each hinge between two panels may be a resilient hinge, tending to bring the panels back to the same plane.

Figure 4:
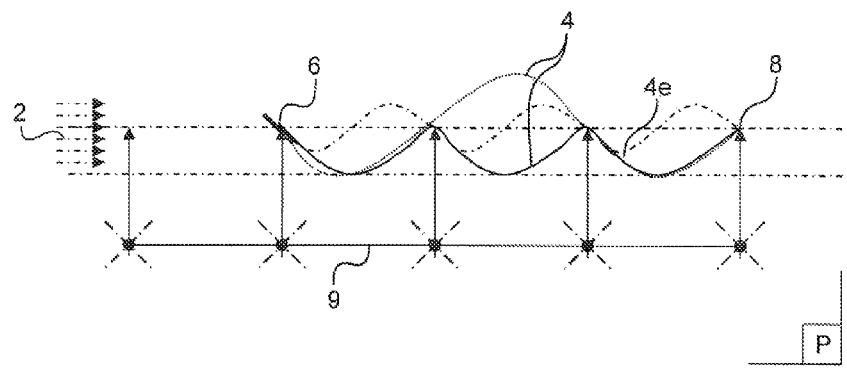
FIG. 4 shows, as in FIGS. 1 to 3, a schematic view of the device according to the invention taken along a longitudinal sectional plane P of the membrane, this FIG. 4 showing in solid lines a first type of membrane at rest which is deflected between its areas of connection to the separation limiting devices; this FIG. 4 also shows in dotted lines a second type of membrane at rest which has a stiffness greater than that of the membrane of the first type (preferably, the membrane of the first type is replaced by the membrane of the second type which forms a sinusoid when at rest); this FIG. 4 also shows a curve in mixed lines which represents one or other of these first and second membranes undulating in the flow 2.
Figure 5:
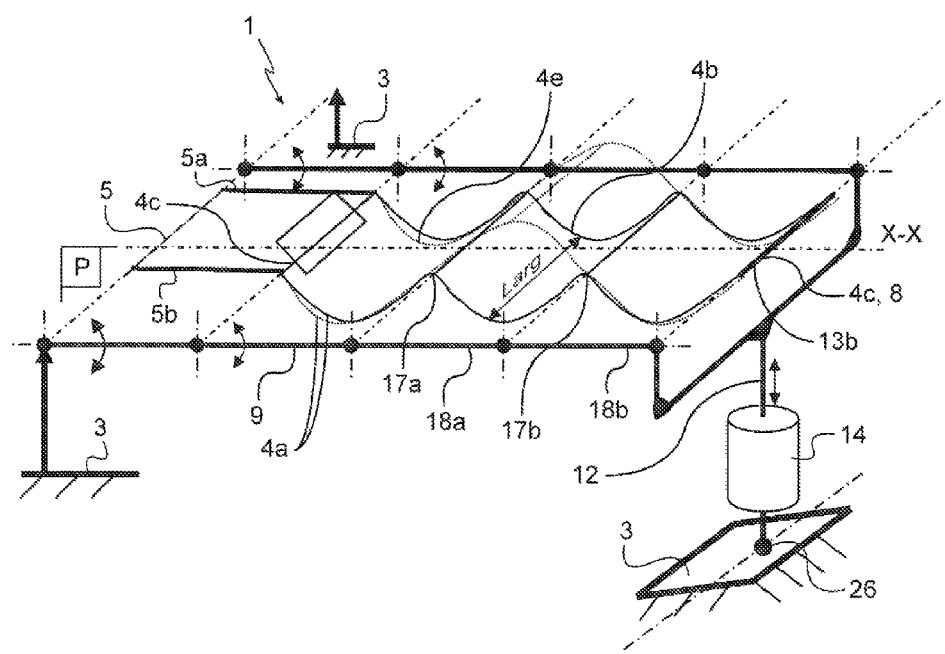
FIG. 5 shows a perspective view of the device according to the invention in an embodiment including a converter 14 for converting a translational movement to electrical energy, and including a head deflector 19, the membrane 4 being at rest in this figure (the membrane of the first type being shown in solid lines and the membrane of the second type being shown in dotted lines)
Figure 6:
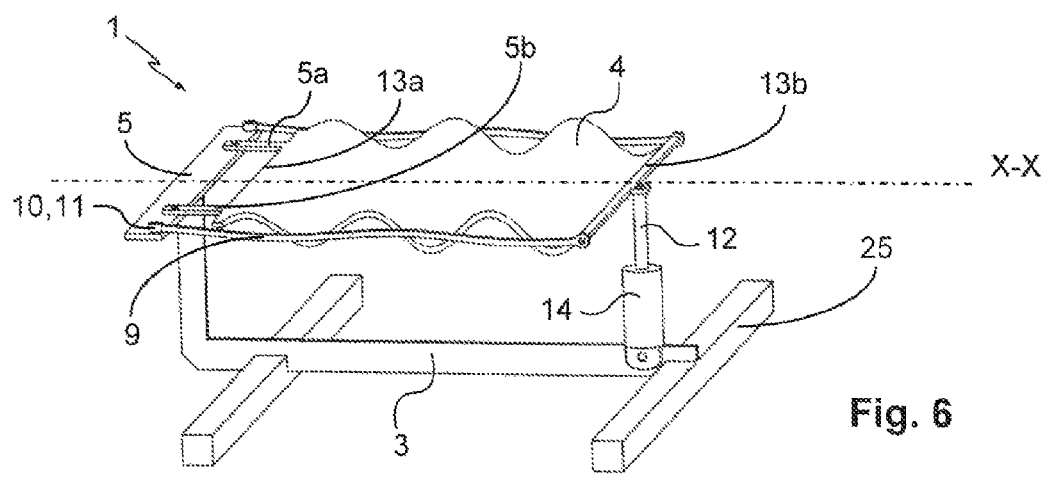
FIG. 6 shows the device according to the invention, placed in a flow, and having a membrane undulating between its only two areas of connection to the separation limiting means, that is to say between the first membrane area which is placed upstream and its second connecting area placed downstream in the direction of the flow.
Figure 7:
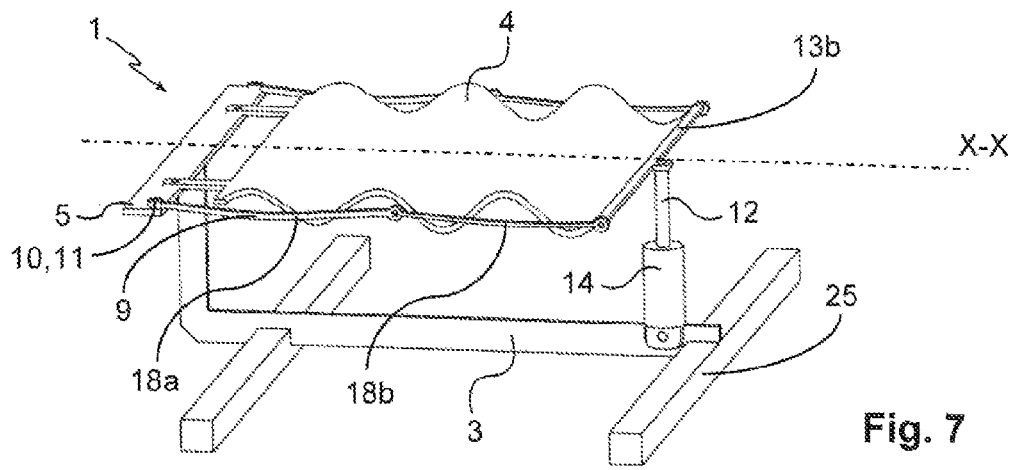
FIG. 7 shows the device according to the invention in an embodiment in which it has separation limiting means connected to a plurality of intermediate points of attachment to the membrane, these intermediate points being placed along longitudinal edges of the membrane between the first and second areas of the membrane, which are, respectively, located along the respective upstream and downstream edges.

The material from which the membrane 4 is made is resilient and is preferably chosen so as to have a buoyancy in the range from 0.8 to 1.2, this buoyancy being 1.1 in the present case. For this purpose, the membrane may be made from an elastomer. As can be seen in FIGS. 4 and 5, where the membrane is at rest, the membrane is supported vertically by the separation limiting means 9. Each part of the membrane at rest carried by these limiting means 9 forms a rounded shape because of the elastic resistance of the membrane to its longitudinal bending. As detailed below in the section headed "The elastic characteristics of the membrane", this bending elasticity/stiffness of the membrane is a parameter affecting the undulatory behavior of the membrane in the fluid flow. The bending elasticity of the membrane is therefore chosen as follows:

as a function of the type of fluid flow in which it is to be immersed (density of the fluid and velocity of flow); and as a function of the separation of the first and second areas 6, 8 from each other; and as a function of the mass of the membrane and the mass of the converter or converters, notably if this converter is carried by the membrane, the forces due to the stiffness being required to compensate the inertial forces due to the masses; and as a function of the amount of energy which it is desired to recover from this fluid flow.

A typical limiting means 9 is a flexible link including at least one flexible cable. As shown in FIGS. 1-11, each cable 9 has one of its ends connected to the attachment system 5 (at a point on the attachment system 10, 11 which is fixed with respect to the support 3) and another of its ends connected to the membrane 4.

The attachment system 5 also includes cables 5a, 5b connected to the first area 6 of the membrane, which in the present case is the upstream edge of the membrane, via an upstream link bar 13a which extends parallel to the upstream edge of the membrane and perpendicularly to its longitudinal sectional plane P.

Force Transmission Means

As shown in particular in FIGS. 1, 2 and 5 to 12, the device 1 also includes force transmission means 12 attached to the second area 8 of the membrane 4 for transmitting mechanical energy from the second area 8 toward an energy converter 14.

As shown in each of FIGS. 6-16, the force transmission means 12 may include a downstream link bar 13b connected permanently to the membrane at the position of the second membrane area 8 which, in the present case, extends along the downstream edge 4d of the membrane.

Figure 2:
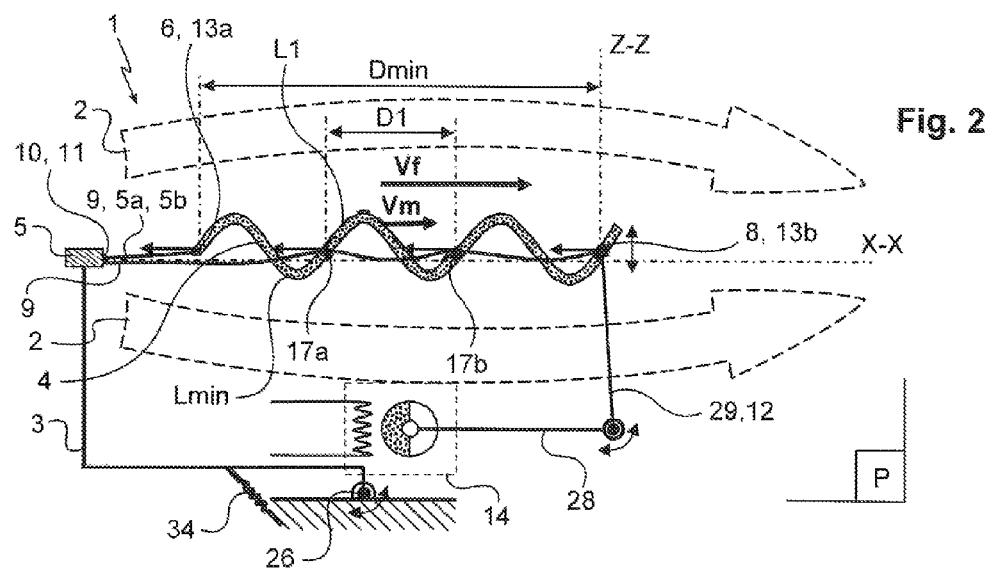
FIG. 2 shows a second embodiment of the invention, also placed in a flow to recover energy therefrom, but using a rotary converter to generate electricity from a rotary movement.
Figure 8:
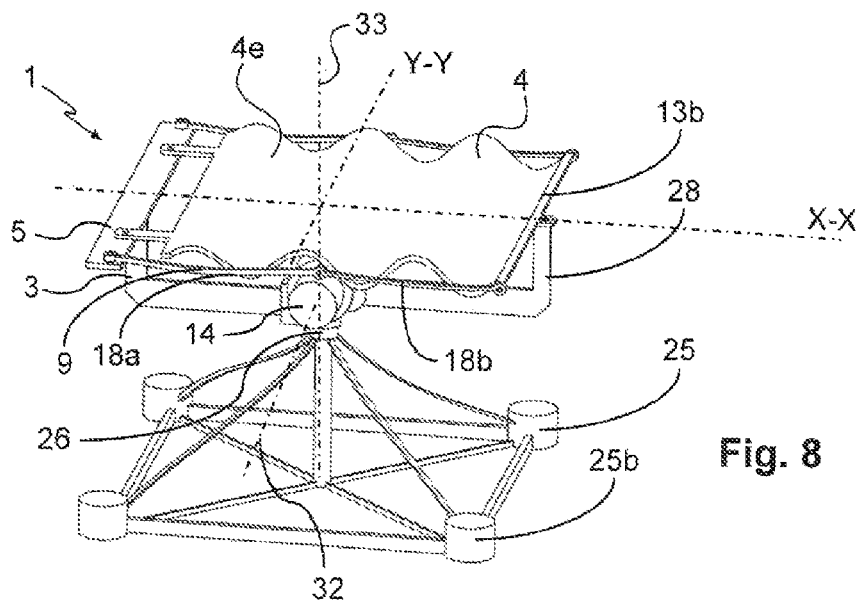
FIG. 8 shows an embodiment of the device according to the invention with a lever arm 28 connecting the second membrane area to a rotary converter and having a support 3 oriented with respect to ballasted positioning means 25*b*.
Figure 9:
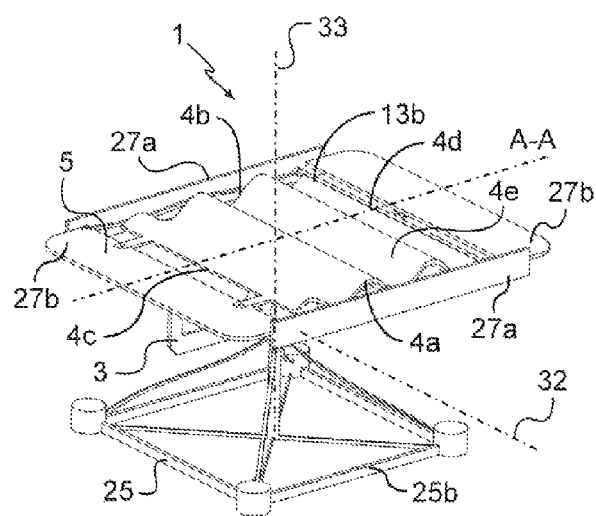
FIG. 9 shows another embodiment of the device according to the invention in which the support is connected by a pivot with a horizontal axis 32 to ballasted positioning means 25*b*, in which embodiment longitudinal support deflectors 27*a* are fixed to the support 3 to guide the fluid stream along the lateral edges 4*a*, 4*b* of the membrane, and transverse support deflectors 27b are fixed to the support 3 to orient the support 3 in the flow.

In the embodiment of FIGS. 2, 8 and 9, it can be seen that the force transmission means 12 may include a lever arm 28 connected to the energy converter 14 where this converter is of the rotary type (in other words, one that converts energy transmitted via a rotary torque and an angular movement about an axis of rotation of the converter into another form of energy such as hydraulic or electrical energy). This lever arm 28 enables the torque to be increased at the position of the converter 14, and may also be useful for adapting the mechanical impedance of the device. This lever arm 28 also facilitates the provision of a solution for sealing at the point of connection to the converter, for example by using a metal bellows.

For example, this lever arm 28 could be made to have an adjustable variable length.

It can be seen in the embodiment of FIG. 2 that the arm 28 is connected to the membrane 4 via the upstream link bar 13b and a connecting member 29. The connecting member 29 extends between one end of the lever arm 28 remote from the converter 14 and at least one attachment point formed on the downstream link bar 13b. The link between the connecting member 29 and the downstream link bar 13b is a pivot link formed at a first end of the connecting member 29. This pivot link between the connecting member and the downstream link bar has its axis parallel to a principal axis of the link bar 13b. The link between the connecting member 29 and the lever arm 28 is a pivot link formed at a second end of the connecting member 29. This link allows the connecting member 29 to pivot with respect to the lever arm 28 about another axis parallel to an axis of rotation of the rotary converter 14.

The Energy Converter

As shown in FIGS. 1, 2, 5 to 12, the energy converter 14 is connected to the force/movement transmission means 12 and to the support 3. This energy converter 14 generates electrical energy from a relative movement of the movement transmission means 12 with respect to the support 3, and from the driving force of the membrane.

Preferably, this energy converter 14 includes:
  means for generating a force of resistance to the movement of the force transmission means 12 with respect to the support 3; and
  means for controlling the variation of this resistive force.

In the present case, the force generating means may consist in the use of magnets associated with the coil of the converter 14 to generate an electromagnetic force in opposition to the movement of the transmission means 12.

This coil may be coupled to an autotransformer and the control means may be a means for controlling the rate of transformation of electrical power by the autotransformer. This function may also be provided by an electronic power and control system, which adapts and adjusts the electrical impedance of the downstream electrical circuit which consumes the captured energy.

When the device 1 is immersed in the fluid flow 2, the membrane is put into movement and drives the transmission means 12 so that it moves in an alternating manner relative to the support 3. Because of the presence of the converter 14, connected on the one hand to the transmission means 12 and on the other hand to the support 3, mechanical energy obtained from the relative movement associated with the driving force can be transformed into re-usable energy. This re-usable energy is:
  either electrical energy, as in FIGS. 1, 2 and 5, in which case the converter 14 is an alternator or dynamo; or
  hydraulic energy, in which case the converter 14 includes a pump for impelling a fluid into hydraulic lines.

The fact that this energy converter 14 includes:
  (a) means for generating a force of resistance to the movement of the transmission means 12 with respect to the support 3; and
  (b) means for controlling the variation of this resistive force makes it possible to control the forces of resistance of the membrane to the action of the fluid (since the membrane is connected to the transmission means to which the resistive force is applied, the movement of the membrane in the fluid flow can be controlled, at least partially, by controlling the value of this resistive force).

In particular, these means for generating a resistive force are adapted to cause a variation in the value of the resistive force as a function of:
  at least one parameter representing a velocity of movement of the membrane as a velocity of movement of the second area of the membrane with respect to the support of the membrane; and/or
  at least one measured parameter of the fluid flow (the measurement is made, for example, with measurement means such as a velocimeter and/or a dynamic pressure sensor), such as its flow velocity Vf and/or its dynamic pressure.

Figure 1:
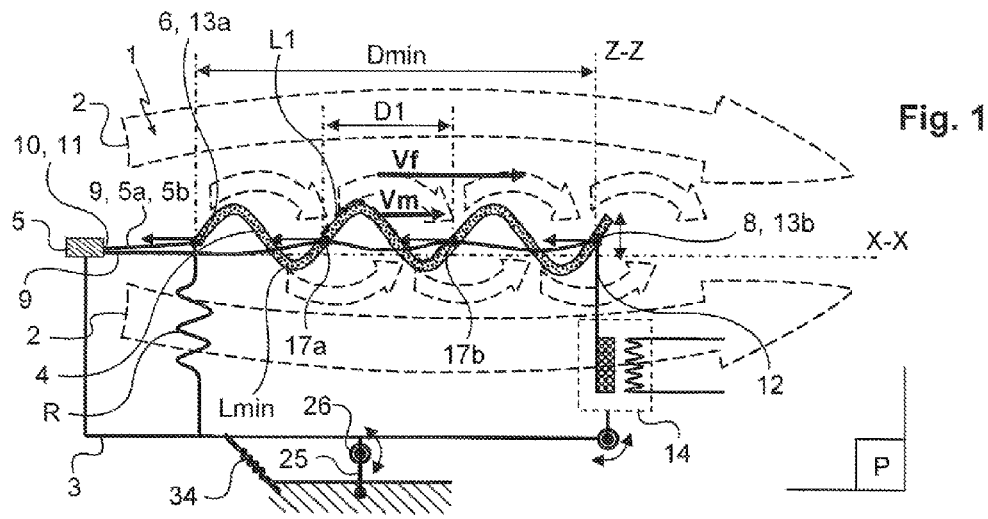
FIG. 1 shows a first embodiment of the device according to the invention, placed in the flow from which it recovers energy via a converter adapted to generate electrical energy from a translational movement.

As shown in FIG. 1, by controlling the resistive force it is possible, for example, to cause the captured energy to vary as a function of the velocity of movement of the second membrane area along an axis Z-Z perpendicular to the fluid flow axis X-X, this perpendicular axis Z-Z extending in the longitudinal sectional plane P of the membrane 4. If this velocity becomes too low with respect to a predetermined low velocity, the value of the resistive force is reduced so that the membrane can start to undulate again at a predetermined velocity. Conversely, if the velocity of movement of the second area of the membrane along the axis Z-Z perpendicular to the fluid flow 2 becomes too great with respect to a predetermined high velocity of movement, the value of the resistive force is made to increase and the velocity of the membrane then decreases.

By proceeding in this way it is possible to arrange for the control to be regulated according to a rule of generation of resistive force intended to adjust the amount of energy obtained as a function of the velocity of movement of at least one point on the second membrane area 8. Thus the extraction of energy from the flowing fluid can be optimized and/or maximized by adjusting the resistive force with the aid of the control means.

The Weights

It should also be noted that the device 1 may advantageously carry weights mounted on the membrane 4 between its first and second areas 6, 8. These weights are assembled onto the membrane using fixing means. Ideally, at least some of these weight fixing means are adapted to allow the selective attachment and detachment of the weight carried. Ideally, it is also possible to arrange for at least some of these weight fixing means to be adjustable, allowing the weight carried to be moved relative to the membrane.

These weights and adjustments of the positions of the weights with respect to the points of fixing of these weights to the membrane can be used to regulate the dynamic behavior of the membrane, notably the propagation velocity of the wave, in a given fluid flow, which has an effect on the efficiency of energy extraction from the flow.

As will be made clear subsequently, the membrane may also carry converters 16a, 16b on board the membrane, which extract the mechanical energy of deformation of the membrane and transform this mechanical energy into electrical energy. It should be noted that each of these on-board converters 16a, 16b has its own weight and may therefore act as a weight mounted on the membrane.

The Separation Limiting Means

As can be seen in FIGS. 1 to 5, 7, 8, 10, and 13 to 16, at least some of the separation limiting means 18a, 18b are connected, respectively, to a plurality of intermediate points 17a, 17b of attachment to the membrane, separated from each other and located between the first and second areas 6, 8 of the membrane. These separation limiting means 18a, 18b which are connected to the intermediate points 17a, 17b are also:

- adapted to limit the separation of each of these intermediate points 17a, 17b with respect to at least one point on the attachment system 5,
- adapted to allow the movement of these intermediate points 17a, 17b with respect to the support 3, and
- adapted to limit the separation of at least some of these intermediate points 17a, 17b from each other, in such a way that the membrane always has a length L1, measured along said face 4e of the membrane and between two of these intermediate points 17a, 17b, which is always greater than the distance D1 separating these two intermediate points 17a, 17b.

In other words, these separation limiting means 18a, 18b are adapted to ensure that each intermediate attachment point 17a, 17b is movable with respect to the support 3. These limiting means 18a and 18b are also adapted to ensure that the separation of the intermediate points 17a, 17b from each other is limited in such a way that the membrane always has a length L1, measured between two of these intermediate points along said face 4e of the membrane, which is always greater than the distance D1 separating these two intermediate points 17a, 17b.

Ideally, the arrangement is such that, when the membrane is at rest, the distance D1 is less than 95% of L1, and preferably such that D1 is less than one half of L1.

Thus the membrane 4 and the intermediate points 17a, 17b are arranged in such a way that the membrane is curved between these intermediate points, because its developed length L1 between these intermediate points 17a, 17b is greater than the minimum distance D1 separating these intermediate points 17a, 17b.

These intermediate attachment points 17a, 17b connected to the attachment system 5 by the limiting means 18a, 18b allow the number of curves of the membrane between its first and second areas 6, 8 to be increased, thereby increasing by the same amount the number of areas of alternation of pressure along the membrane. Thus the amount of energy that can be extracted by the membrane is also increased, in certain conditions.

Furthermore, these intermediate attachment points 17a, 17b make it possible to have as many curves as there are membrane areas located between two consecutive upstream and downstream attachment points. For example, the shape of the undulation of the membrane in the fluid flow can be regulated by adding intermediate attachment points between the first and second areas 6, 8. Typically, by increasing the number of attachments 17a, 17b along the length of the membrane, the membrane wave is made to have a shorter period/length. This arrangement of the intermediate attachment points also makes it possible to vary the amplitude of the wave formed by the membrane and the frequency and propagation velocity Vm of this wave.

Figure 3:
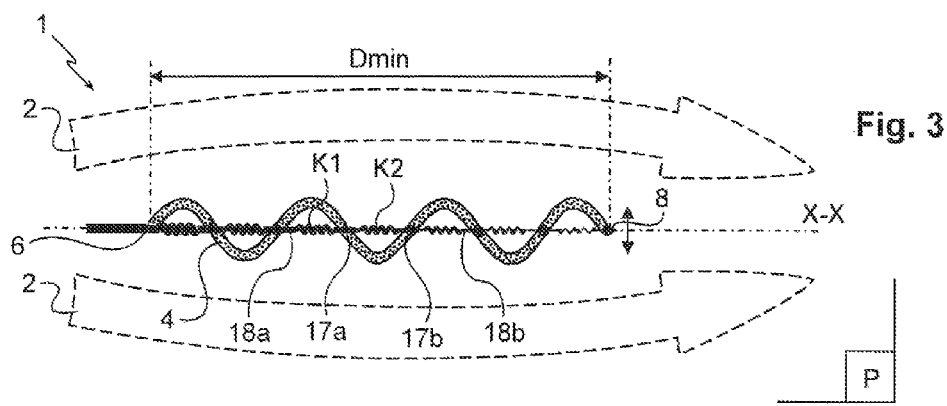
FIG. 3 shows an embodiment of the invention in which the means for limiting the separation of areas of the membrane are resilient means having decreasing respective stiffnesses in the direction of the flow.

It should be noted that each of the limiting means 18a, 18b connected to the intermediate points can be formed as shown in FIGS. 1, 3, 5 with wires or cables extending between an intermediate point 17a and a point on the attachment system which is preferably fixed with respect to the support 3.

Although this is not shown in the drawings, it is also possible to provide means for regulating, independently of each other, the various separations of the areas 6, 8 and the intermediate points 17a, 17b with respect to their respective points of attachment to the attachment system 5. These adjustments can be chosen so as to adapt the positions of the intermediate points on the membrane as a function of characteristics of the flow and/or the forces transmitted by the membrane.

Figure 14:
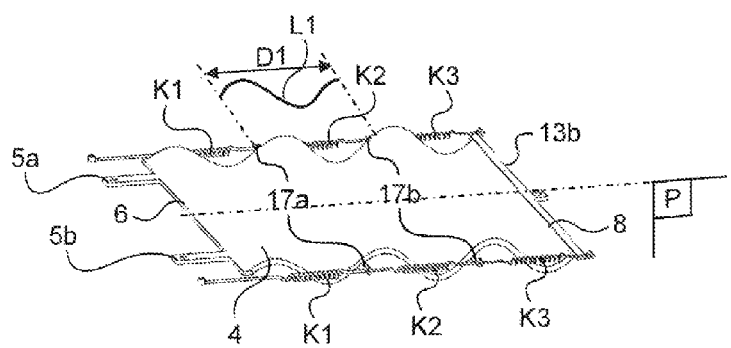
FIG. 14 shows a portion of the device according to the invention used to apply the invention in its embodiment shown in FIG. 3, according to which the separation limiting means are resilient and have a plurality of stiffeners K1, K2, K3 to reduce the risk of damage to the membrane due to an excessively powerful flow.

As shown in the diagram of FIG. 3 and in the embodiment of FIG. 14, at least some of the separation limiting means 18a, 18b may be resilient; in the present case they are tension coil springs.

For any given pair of separation limiting means 18a, 18b, each is made to have a natural stiffness K1, K2.

The first limiting means 18a of this pair is connected to the membrane at a first location between its first and second areas 6, 8. This first location may be one of the intermediate points of attachment of the membrane 17a, 17b.

The second limiting means 18b of this pair is connected to the membrane at a second location between the first location and the second area 6 of the membrane.

The natural stiffness K1 of the first of the limiting means 18a is chosen to be greater than the natural stiffness K2 of the second of the limiting means 18b.

This characteristic of resilience of the linking means allows each of these limiting means 18a, 18b to be elongated when a tensile force is exerted to stretch the membrane between the first and second locations.

In this embodiment including resilient separation limiting means, the amplitude of the curve of the membrane and the amount of energy extracted from the fluid flow can be reduced as a function of the elongation of these limiting means 18a, 18b. The risks of damage to the membrane when it is subjected to an excessively powerful flow are therefore reduced.

As shown schematically in FIG. 3, the fact that the stiffnesses K1, K2 of the limiting means 18a, 18b decrease as their points of attachment approach the second area 8 enables the reduction of wave amplitude to be prioritized in areas near the second area 8.

If the membrane becomes overloaded because the flow 2 is too fast, the reduction of the membrane wave amplitude in the areas located in the proximity of the second membrane area is initially prioritized. Then, if this limiting is insufficient, the wave amplitude is further limited in a portion of membrane located nearer the first area, and this continues until the membrane is fully stretched and virtually flat.

One effect of these resilient limiting means 18a, 18b is to regulate, beyond a certain fluid velocity Vf, the velocity of the wave Vm of deformation of the membrane as a function of the velocity Vf of the fluid (these velocities Vm and Vf are represented in FIGS. 1 and 2).

The installation of the resilient limiting means is shown in detail in FIG. 14.

It can be seen in this drawing that the limiting means are made in the form of coil springs mounted in two series of springs, one on each side of the longitudinal edges of the membrane. Each of the series of springs extends between the first and second membrane areas parallel to a corresponding longitudinal edge of the membrane. For each of the series of springs, it can be seen that the springs have natural stiffnesses arranged in decreasing order from a maximum stiffness K1 in the proximity of the first area 6 to a minimum stiffness K3 in the proximity of the second area 8. The series of springs placed on either side of the membrane are identical to each other, particularly as regards the chosen stiffnesses of the springs, to enable the longitudinal edges of the membrane to be deformed substantially in the same manner and in synchronization, thus promoting the creation of undulations perpendicular to the longitudinal sectional axis of the membrane. The aim is to ensure that a given wave of the membrane has a constant amplitude, in other words that the deviation of the amplitude of each given wave over the width of the membrane, relative to the mean amplitude of the wave over the width of the membrane, is less than 10% of this mean amplitude.

The springs in the same series of springs are attached to each other serially and in pairs. Each junction of two springs of a series of springs forms a spring junction point allowing the two springs of the series to pivot with respect to each other. Thus, for a given series of N springs, there are N−1 junction points. The membrane includes a plurality of intermediate points 17a, 17b of connection to the springs. These intermediate points 17a, 17b of the membrane are distributed in two series of intermediate points. Each series of intermediate points extends along its own longitudinal edge of the membrane. These series of intermediate points are symmetrical with each other about a central longitudinal sectional plane P of the membrane. Thus the distribution of the intermediate points 17a, 17b of one series on the longitudinal edge of the membrane carrying this series is identical to the distribution of the intermediate points of the other series of intermediate points on the other edge of the membrane. Each series of intermediate points of the membrane is connected to a corresponding series of springs. For this purpose, each intermediate point of a given series of intermediate points is connected to a single junction point of the corresponding series of springs. Each of the connections between a junction point of a series of springs and a corresponding intermediate point 17a, 17b of the membrane is a connection allowing freedom of rotation of the intermediate point of the membrane relative to the junction point about an axis passing through this intermediate point and perpendicular to the longitudinal sectional plane P of the membrane. Thus the deformation of the membrane between two of its intermediate points may be different from the deformation of a spring between its junction points. In this embodiment of the invention, as in all the other embodiments, each mechanical connection of the membrane to one of the separation limiting means is made to allow rotation of the membrane with respect to the limiting means about an axis perpendicular to the longitudinal sectional plane of the membrane (in other words, about an axis perpendicular to the direction of the flow). By means of this type of connection, the limiting means are able to limit the distance between the first and second areas of the membrane and the distance between intermediate points of the membrane without thereby preventing the propagation of the waves along the membrane.

In certain embodiments of the device according to the invention, such as those shown in FIGS. 25a, 25b and 26, the membrane may be connected to the support 3 as follows:

- at its first area 6 (the upstream area) via a rigid link 5a, one end of which is mounted pivotably with respect to the support 3 so as to allow the rotation of the first area with respect to the support 3; and
- at its second area 8, via a link 9 (which may be flexible or rigid) serving as a means of limiting the separation of the two areas 6 and 8 from each other.

In these embodiments, there is no intermediate link between the first and second areas to connect the membrane to the support. The link 9 is hinged with respect to the support 3 so as to allow the second area 8 to rotate with respect to the support 3. This hinge is positioned upstream of the membrane 4 so that this link 9 is subjected to a tensile load under the effect of the fluid flow from the first area 6 toward 2U the second area 8.

Figure 25A:
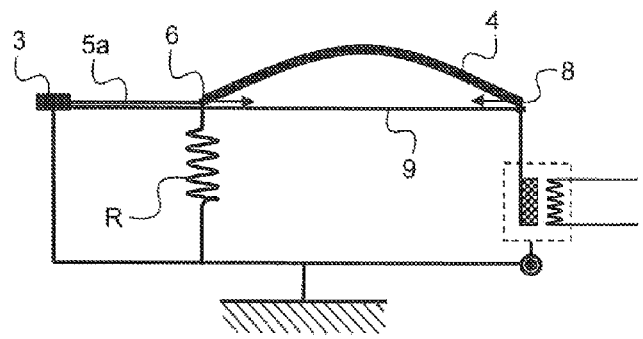
FIG. 25a shows a side view of a device according to the invention when it is not subjected to any flow, with its membrane held by the separation limiting means and forming a half-wave because of its rigidity. A suspension R provides a return force and centering of the upstream edge of the membrane.
Figure 25B:
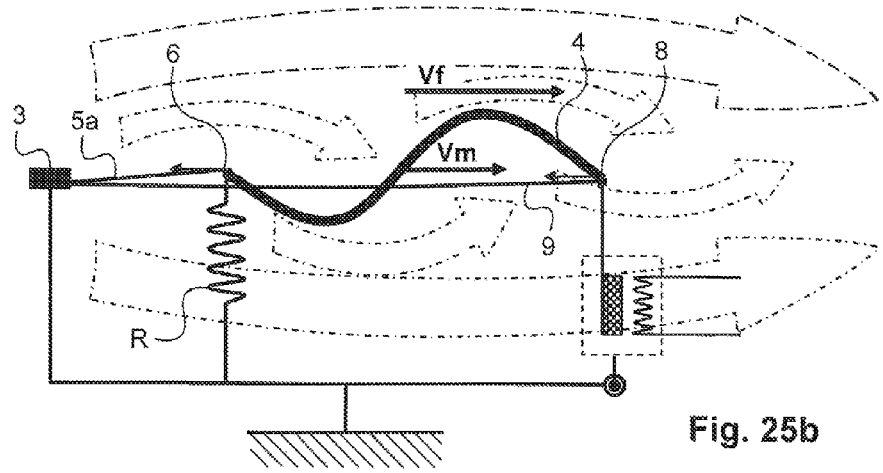
FIG. 25b shows the device of FIG. 25a when it is subjected to a flow with a velocity Vf, a membrane deformation wave being generated by the flow and propagating from the upstream to the downstream and of the membrane at a velocity Vm.

In the embodiment of FIGS. 25a and 25b (as in FIGS. 1, 2, 5 and 16), the link 5a is arranged to be subjected to a tensile load under the effect of the flow directed from the first 6 to the second 8 area of the membrane. In this embodiment, the upstream edge 6 of the membrane subjected to the flow tends to return to a central position, thus reducing the sensitivity to the initiation of the movement.

Figure 26:
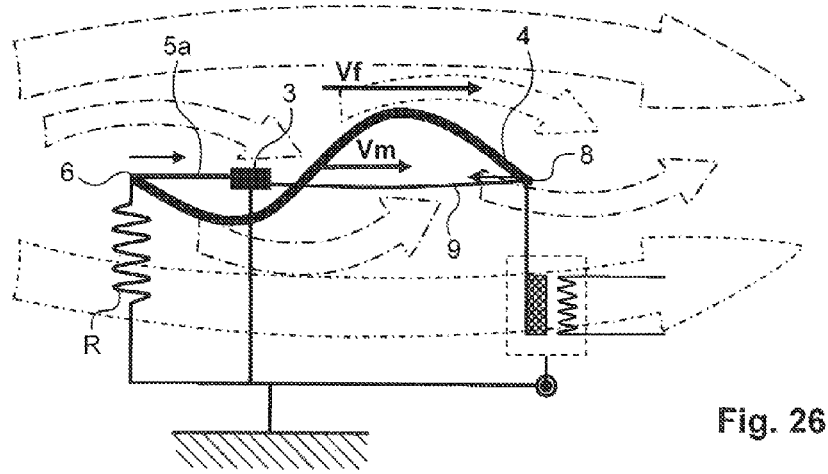
FIG. 26 is a side view of another embodiment of the device according to the invention when it is placed in a flow with a velocity Vf.

Conversely, in the embodiment of FIG. 26, the link 5a is arranged to be subjected to a compressive load under the effect of the flow directed from the first 6 to the second 8 area of the membrane. In this embodiment, the upstream edge 6 of the membrane subjected to the flow tends to move away from a central position, thus increasing the sensitivity to the initiation of the movement.

The Shape of the Membrane

Figure 15:
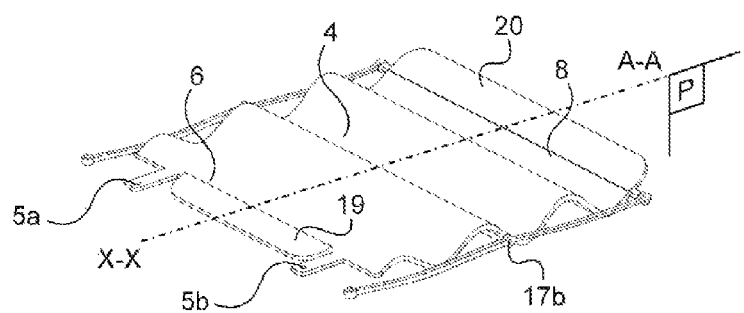
FIG. 15 shows an embodiment of the membrane in which it can be seen that the membrane is fitted with a head deflector 19 placed along an upstream transverse edge of the member and a tail deflector 20 placed along a downstream edge of the membrane.

As shown in FIG. 15, the device 1 according to the invention may advantageously include a head deflector 19 connected to the membrane 4 in a rigid fashion and located between the attachment system 5 and the first area of the membrane 6, and/or a tail deflector 20 connected in a rigid fashion to one end of the membrane and extending beyond the second membrane area 8.

These head 19 and tail 20 deflectors are each formed from a rigid strip.

The head deflector 19 which is placed at the start of the membrane (in other words, at its first area 6, along the upstream edge 4c) facilitates the initiation of the wave, because, when it is subjected to a flow, it pivots about an axis perpendicular to the longitudinal sectional plane P of the membrane and forces the membrane to pivot and undulate in the flow.

The tail deflector 20 is placed at the tail of the membrane (in other words, at c) its second area 8, along the downstream edge 4d). When it is subjected to a flow, this deflector 20 tends to exert a torque on the tail of the membrane which returns this end of the membrane toward a position in which it would extend parallel to the axis of the flow X-X.

Thus the torque on the membrane is reduced at the position of the attachment of the transmission means 12 to the second membrane area 8.

These head 19 and tail 20 deflectors can be molded with the membrane 4, thereby imparting rigidity and greater strength to the connections between the deflectors and the membrane. For example, FIG. 15 shows that the head deflector 19 and tail deflector 20 are molded directly with the membrane in its first and second areas 6, 8 respectively.

Figure 18:
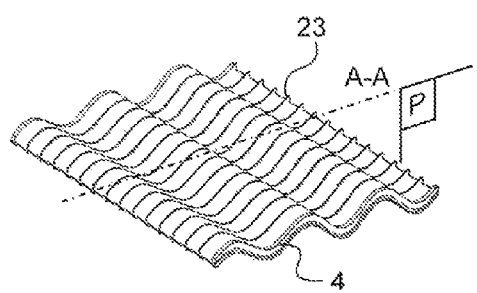
FIG. 18 shows a membrane including longitudinal ridges 23 on at least one face of the membrane, to guide the fluid flow along the membrane.

In certain embodiments, such as that of FIG. 18, longitudinal ridges 22 extend over at least one of the faces 4e of the membrane 4 in planes parallel to the longitudinal sectional plane P of the membrane passing through the first and second areas 6, 8.

These longitudinal ridges 22 are oriented parallel to the fluid flow in order to guide the flow along the membrane, thus reducing the energy loss caused by the flow of fluid toward the longitudinal edges of the membrane.

These longitudinal ridges 22 also enable the longitudinal stiffness of the membrane to be increased.

In certain embodiments, such as that of FIG. 19, transverse ridges 21 extend over at least one of the faces 4e of the membrane perpendicularly to the plane P passing through a longitudinal axis A-A of the membrane.

These transverse ridges 21 are thus oriented perpendicularly to the flow of fluid X-X from the first area 6 toward the second area 8. These ridges 21 create local resistance to the flow along the membrane and enable an increased amount of energy to be captured, compared with a situation in which the membrane had perfectly smooth faces 4*e*.

Figure 17:
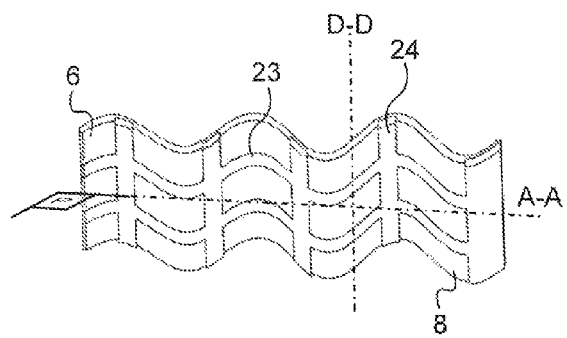
FIG. 17 shows an embodiment of the membrane which can be used to apply the device according to the invention and which includes longitudinal reinforcers 23 to transmit the deformation energy along the membrane and transverse reinforcers 24 to limit transverse deformations of the membrane.

As shown in FIG. 17, the device 1 may include a longitudinal reinforcer 23 extending along the membrane 4 between the first and second areas 6, 8 of the membrane. This reinforcer 23 is adapted to increase the resistance of the membrane to bending about a bending axis such as the axis D-D extending perpendicularly to a longitudinal sectional plane P of the membrane passing through its first and second areas 6, 8.

Owing to this longitudinal reinforcer 23 which increases the longitudinal stiffness of the membrane, the mechanical coupling of the membrane to the force transmission means 12 and consequently to the energy converter 14 is improved. For a given bending force, the membrane has less of a tendency to bend about its longitudinal axis A-A. Thus it is possible to use the force transmission means 12 to transmit a force greater than that which would be transmitted if this membrane had no resilient longitudinal reinforcer 23. This longitudinal reinforcer also makes it possible to avoid local deformation of the membrane under the effect of the dynamic pressure of the fluid.

A plurality of reinforcers may be arranged in parallel if this is required by the width of the membrane. This reinforcer may have a cross section and/or a stiffness varying from the upstream edge toward the downstream edge in such a way that the deformation energy accumulates along the path of the wave and is propagated optimally until it reaches the converter.

Figure 16:
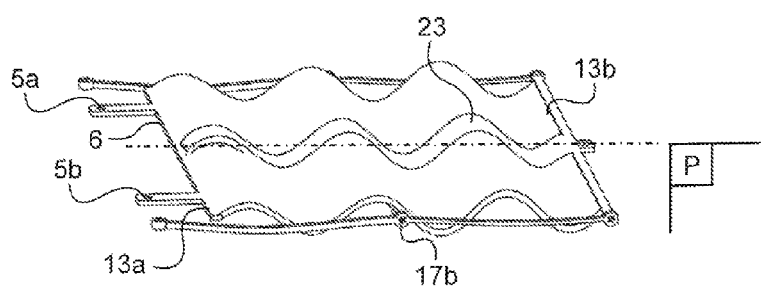
FIG. 16 shows an embodiment of the membrane in which the membrane carries a longitudinal reinforcer 23 extending along the membrane between its first and second membrane areas in order to reinforce the bending resistance of the membrane in relation to the bending of the membrane about axes perpendicular to the longitudinal sectional plane P of the membrane.

As shown also in FIGS. 16 and 17, the device 1 may also include transverse reinforcers 24 extending along a face 4*e* of this membrane and perpendicularly to a longitudinal sectional plane P of the membrane passing through the first and second areas 6, 8. These transverse reinforcers 24 are adapted to increase the resistance of the membrane to bending about a longitudinal bending axis A-A passing through the first and second areas 6, 8 of the membrane.

Because of these transverse reinforcers 24, the transverse stiffness of the membrane is increased. Thus there is a reduced risk of unwanted bending of the membrane which might cause the membrane to twist along the fluid flow, which might damage it and lead to a reduction of the amount of energy extracted from the flow.

The reinforcers 23 and 24 can be made from a composite material with a high modulus of elasticity, such as carbon fiber or glass fiber.

The Elastic Characteristics of the Membrane

As mentioned above, the flexible membrane is chosen to have a longitudinal elastic stiffness in bending which gives it bending resistance in its longitudinal direction, in other words bending resistance at least between its first and second areas 6, 8, namely the upstream and downstream areas. In other words, this longitudinal elastic stiffness K is such that the membrane has resistance to bending about bending axes D-D extending perpendicularly to the longitudinal sectional plane P of the membrane passing through its first and second areas 6, 8 (see FIGS. 23 and 24).

This longitudinal elastic stiffness in bending of the membrane is chosen as a function of the weight of the membrane and in such a way that, when the device is immersed in a liquid flow having a flow velocity in the range from 0.3 m/s to 5 m/s in absolute terms, the membrane (when seen in longitudinal section) has at least one complete undulation between its upstream and downstream edges (when the device has no intermediate points 17*a* or 17*b*) or between two of the intermediate points 17*a*, 17*b* of the membrane which are adjacent to each other. Preferably, the characteristics of the membrane such as its longitudinal bending stiffness are chosen to be such that it has at least one half undulation instead of at least one undulation.

Ideally, in order to enhance the energy recovery efficiency of the device 1, characteristics of the membrane such as its stiffness, its weight, and the separation limiting means 9 are chosen to be such that the velocity of propagation of the wave Um along the membrane is in the range from $\frac{1}{5}$ to $\frac{2}{3}$ of the fluid flow velocity Vf and is preferably equal to $\frac{1}{3}$ of this fluid flow velocity Vf.

Figure 24:
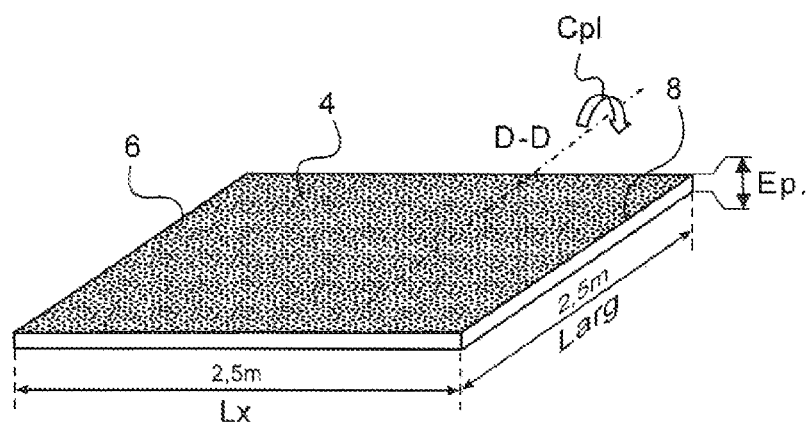

These undulation modes with one half undulation or one complete undulation are shown in FIG. 24, in which the curves C1 and C2 illustrate the variation of amplitude Amp of the membrane between two of its points whose separation is limited. The maximum amplitude is denoted by W.

Each curve C1, C2 is formed by taking a membrane and connecting it to the support between its first and second areas 6, 8 so as to limit the separation Dx of the membrane points from each other. Since this separation distance Dx is less than the membrane length Lx and since this membrane has bending stiffness, it forms at least one half-wave by bending. Each fixing at 17*a*, 17*b* is such that the membrane remains free to pivot about a transverse pivot axis of the membrane (in other words, with a pivoting movement perpendicular to the longitudinal sectional plane P of the membrane). After fixing, the membrane is subjected to a fluid flow having a given velocity and it is found that the membrane starts to undulate in a vibration mode which is natural to it and which determines its capacity to extract energy from the flow.

The curve C1 represents a mode of undulation of a longitudinal portion of a first membrane having a first given longitudinal bending stiffness, the undulation between the points 17*a*, 17*b* being a half-wave in this case.

The curve C2 represents a mode of undulation of a longitudinal portion of another membrane having another given longitudinal bending stiffness, the undulation between the points 17*a*, 17*b* being a full wave in this case (an undulation of virtually sinusoidal shape having a complete period between the points 17*a* and 17*b*).

Ideally, the stiffness of the membrane, as well as its thickness, its width, its length between the points 17*a* and 17*b*, and the separation and number of these connecting points 17*a* and 17*b* are determined so as to maximize its energy recovery capacity in a given flow.

To achieve this, it is preferable to use undulation modes having a full wave or a complete half-wave between two adjacent fixing points.

Calculation of Membrane Characteristics for a Given Flow.

1) In accordance with the environment in which the device is to be installed and the chosen means for connecting the membrane to the support, the following quantities are determined:

L, which is the length of membrane free to undulate between two attachment points (in the case of a membrane connected to the support solely via its first and second areas 6 and 8, L is the total length of the membrane. In this case, there are no intermediate connecting points); and Larg, which is the width of the membrane.

2) Given the velocity Vf of the flow from which energy is to be captured, the desired velocity Vm of propagation of the wave on the membrane is determined. Ideally, Vm=Z*Vf, where Z is a differential coefficient between the velocities Vm and Vf. Z is chosen to be between $\frac{1}{5}$ and $\frac{2}{3}$, and is preferably equal to $\frac{1}{3}$.

3) The desired period T of undulation of the membrane is calculated as:

$$T = L/Vm.$$

4) The desired natural frequency $\omega$ of the membrane is determined by the formula:

$$\omega = 2\pi/T$$

5) Given the desired ideal natural frequency $\omega$, and given that the natural frequency of a membrane $\omega_n$ is defined by the formula:

$$\omega_n^2 = \alpha^{4*}(E^*I_x/(q^*L^4)),$$

the factor "$E^*I_x$" is determined, which makes $\omega_n$ tend toward the ideal natural frequency $\omega$, with the stiffness of the membrane compensating for the inertial forces due to its weight.

It should be noted that:
- $\alpha$ is a coefficient chosen according to the preferred undulation mode chosen for the membrane and according to the assembly means chosen for the membrane;
- E is the modulus of elasticity of the membrane;
- Ix is the moment of inertia of the membrane;
- q is the linear density of the membrane;
- L is the length of the membrane.

Figure 22:
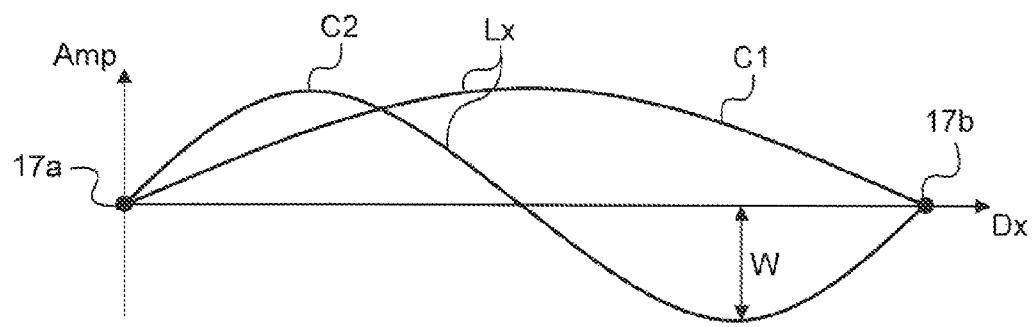
FIG. 22 shows different undulation modes of membranes of devices according to the invention when the membranes are placed in a flow.

By way of example, if an undulation mode called mode 2 is prioritized (where the undulation curve of the membrane has the shape of the wave C2 in FIG. 22), the following values are possible:
- $\alpha = 3.142$ if the membrane is free to rotate upstream (in its first area) and if it is connected downstream to the converter 14; or
- $\alpha = 2.345$ if the membrane is free to rotate (in its first area) and if its weight is high (for example, if the converter is on board the membrane).

For examples of the choice of a, reference may be made to "Théorie des vibrations-Application à la dynamique des structures" by M. Géradin and D. Rixen (2nd corrected and augmented edition), published by Masson.

The value of q is given by the formula:

$$q = \sigma^*L^*e$$

where
- $\sigma$ is the surface density of the membrane (the surface density is increased if the converter is on board the membrane, as the weight of the reinforcers and attachment components must be added, as well as a value for the weight of coupled fluid);
- e is the thickness of the membrane;
- L is the length of the membrane.

Figure 23:
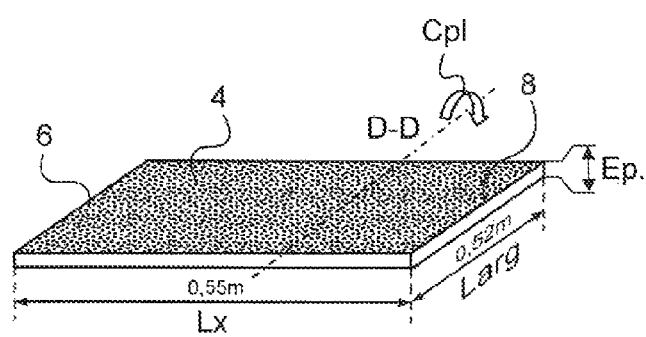
FIGS. 23 and 24 show membranes for the use of the device according to the invention, these membranes extending in a flat form when at rest.

If the membrane is of the prismatic type, as in the case of the membranes of FIGS. 23 and 24, the value of Ix for the membrane is given by the formula:

$$Ix = Larg^*e^3/12$$

where
- Larg is the width of the membrane; and
- e is its thickness, also denoted Ep.

6) When the length L, the width Larg, the thickness e of the membrane and the factor (E*Ix) have been determined, it is possible to define the minimum longitudinal bending stiffness K which the membrane must have in order to undulate at the desired velocity and in the desired vibration mode, in the chosen flow. For this purpose, the following formula is used:

$$K \geq (\alpha^{4*}E^*Ix)/(L^3)$$

This stiffness K and the power of the converter 14 must be specified in such a way that the membrane maintains an undulation shape allowing the wave to be propagated at the requisite velocity Vm. FIGS. 23 and 24 show ideal membranes for the construction of devices according to the invention. Each of these membranes forms a flexible rectangular plate of elastomer which naturally returns to its flat shape when laid on a flat support.

The local minimum thickness of the membrane is chosen to be such that the minimum thickness K and the minimum moment of inertia prevent local deformations of the membrane which would detract from the performance of the machine.

| Parameters of the membrane of FIG. 23: Undulation mode C1 of FIG. 22 | Values |
| --- | --- |
| Length L | 0.55 m |
| Width Larg | 0.52 m |
| Thickness (Ep.) | 0.005 m |
| Mean Young's modulus E (*) | 53 MPa |
| Linear density | 5.5 kg/m |

| Parameters of the membrane of FIG. 24: Undulation mode C2 of FIG. 22 | Values |
| --- | --- |
| Length L | 2.5 m |
| Width Larg | 2.5 m |
| Thickness (Ep.) | 0.01 m |
| Mean Young's modulus E (*) | 650 MPa |
| Linear density | 40.8 kg/m |

(*) Note that the Young's modulus is the mean of a plurality of measurements in this case. The Young's modulus is measured for the longitudinal bending of the membrane, in other words when the membrane is subjected to a force creating a torque Cpl about a transverse axis D-D of the membrane extending across its width (this type of force is similar to that which causes the undulation of the membrane).

For the application of the invention, since the separation between adjacent points 17a, 17b is greater than one meter, it will be preferable to use a membrane having a Young's modulus in longitudinal bending E greater than 5 MPa.

Ideally, the membrane is chosen so as to have:
- high longitudinal elastic stiffness in tension, to limit its longitudinal elongation in tension; and
- high transverse elastic stiffness in tension, to limit its transverse elongation in tension.

To this end, the stiffness is chosen in such a way that the transverse elongation is less than $\frac{1}{50}$ of the width Larg and $\frac{1}{50}$ of the length L. One way of limiting the stiffness in tension without excessive effects on the bending stiffness is to reinforce the membrane with very stiff flexible fibers.

It should be noted that the longitudinal bending stiffness of the membranes may be substantially constant along its length, but it is also possible for this longitudinal elastic bending stiffness to be variable along the membrane. Thus the bending stiffness of the membrane may increase from the first area 6 (the upstream area) toward the second area 8 (the downstream area) of the membrane. This increase in the longitudinal bending stiffness may be provided by means of a bearing or bearings, or in a regular manner. For example, there will be more bearings if the downstream longitudinal portion is a sandwich of several layers of elastomer and if an upstream longitudinal portion of the membrane is formed by a smaller number of layers, or a single layer, of elastomer.

Conversely, there will be a regular increase in stiffness if the thickness of the membrane increases regularly from its upstream area to its downstream area.

The Positioning Means

Figure 11:
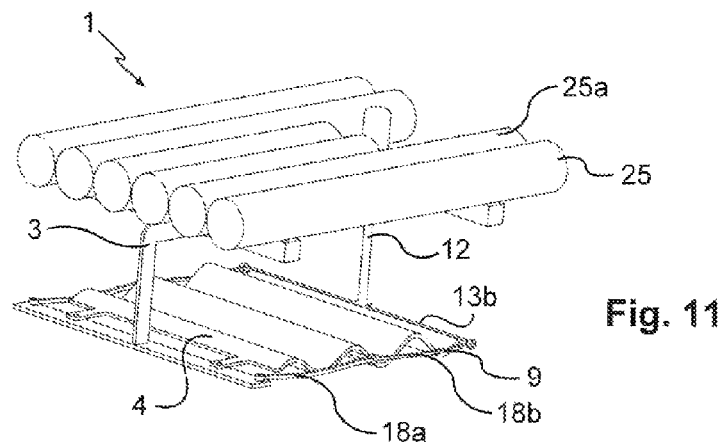

As shown in FIGS. 8 to 12, the device includes means 25 for positioning the device in its environment. These positioning means 25 are:

- either buoyant 25*a*, as shown in FIG. 11, and adapted to position the device in the flow by buoyancy in the flow;
- or ballasted 25*b*, as shown in FIGS. 8, 9 and 12, and adapted to position the device on a ground which limits the flow.

These positioning means 25 are connected to the support 3 by at least one hinge 26 for orienting the support 3 with respect to these positioning means 25.

The term "hinge 26" signifies any connecting means adapted to connect the support 3 to at least some of the positioning means 25 and allowing at least a degree of mobility of the support 3 with respect to at least some of these positioning means 25.

In particular, as shown in FIGS. 8 and 9, the hinge 26 includes first and second orientation axes 32, 33. The first orientation axis 32 is adapted to allow the positioning means 25 to pivot with respect to the support 3 about this first orientation axis 32. The second orientation axis 33 is adapted to allow the positioning means 25 to pivot with respect to the support 3 about this second orientation axis 33.

These first and second orientation axes 32, 33 are arranged in planes which are perpendicular to each other, such that the first orientation axis 32 can be placed in a horizontal plane while the second orientation axis 33 is placed in a vertical plane.

This embodiment is advantageous because it allows the device to be positioned in its environment by using its positioning means 25 and the hinge 26. On the other hand, the embodiment allows the support 3, and therefore the membrane 4, to be positioned in the same environment as a function, notably, of the fluid flow around the device 1. The orientation of the membrane 4 in the flow makes it possible to have a direction of flow from the first area 6, which is placed upstream, toward the second area 8, thus maximizing the extraction of energy from the flow 2.

It should be noted that, in one embodiment, the device according to the invention may have only one orientation axis, which may allow orientation about a vertical axis (as in FIG. 10) or about a horizontal axis (as in FIGS. 1 and 2).

With orientation about the vertical axis 33, when the device is placed in the sea, there is a gain in performance over the daily cycle of the tidal current, because the latter changes its orientation.

Orientation about a horizontal axis 32 is useful for enabling the system to be oriented as a function of swell movements which are low-frequency movements by comparison with the undulation frequency of the membrane 4. It should be noted that this horizontal axis 32 may be placed between the positioning means 25 and the support 3 which carries the converter 14, and under this converter 14, as shown in FIG. 2.

The embodiments of FIGS. 1 to 9, 11 and 12 show the membrane parallel to the ground and substantially horizontal. These embodiments are preferred if the device is in a shallow area with a high fluid velocity and high potential for extraction of hydrokinetic energy.

Figure 10:
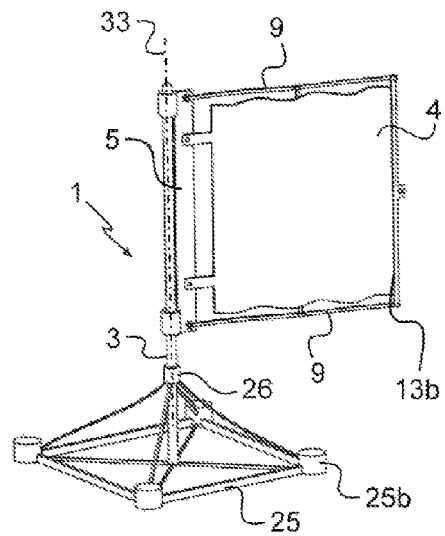
FIG. 10 shows another embodiment of the device according to the invention in which the support 3 is oriented with respect to the ballasted positioning means 25b by means of a pivot with a vertical axis 33.

The embodiment of FIG. 10, with the membrane vertical, can be used on shoals compatible with very high devices, and is also less sensitive to swell movements.

The embodiment of FIG. 11, where the positioning means 25 is buoyant 25*a*, is used to keep the membrane close to the surface, where the flow velocities are greatest. This embodiment may be useful for positioning the converter out of the water, which increases its service life.

As shown in FIGS. 1 and 2, the device may also include a resilient return means 34 for returning the support 3 to a central position with respect to the positioning means 25. This return means 34 is connected, on the one hand, to the support 3, and, on the other hand, to the positioning means 25, and forces the support to move by means of the hinge toward a central position assumed by the support in the absence of any flow.

The Supporting Deflectors

As shown in FIG. 9, the device may include longitudinal supporting deflectors 27*a*, and/or first and second transverse supporting deflectors 27*b*.

The longitudinal supporting deflectors 27*a* are fixed to the support 3 and extend, respectively, in planes parallel to each other and parallel to an axis A-A passing through the first and second areas 6, 8. The membrane 4 is arranged between these planes which contain, respectively, the longitudinal supporting deflectors 27*a*.

The first and second transverse supporting deflectors 27*b* are fixed to the support 3 and extend in the same plane. The first transverse supporting deflector 27*b* is parallel to a front edge of the membrane 4*c* opposite the first membrane area 6, and the second transverse supporting deflector 27*b* is parallel to a rear edge 4*d* of the membrane opposite the second membrane area 8.

The longitudinal 27*a* and transverse 27*b* supporting deflectors are useful, in particular, when used in combination with at least one hinge 26 for orienting the support 3 with respect to the positioning means 25. In this embodiment, these transverse and longitudinal supporting deflectors serve as fins for orienting the device in its environment. This is because the longitudinal deflectors allow the support to be oriented about a vertical axis, while the transverse deflectors allow the support to be oriented with respect to a horizontal axis. In this embodiment, these deflectors enable the adaptation of the device to its environment to be improved for better energy capture from the flow.

The longitudinal deflectors provide a gain in efficiency at the edges of the membrane in the vicinity of these deflectors.

The transverse deflectors 27*b* also provide an increase in the pressure differences over the neighboring membrane faces, and a gain in efficiency at the upstream 4*c* and downstream 4*d* edges of the membrane 4 in the capture of hydrokinetic energy.

Each longitudinal supporting deflector 27*a* is positioned along a longitudinal membrane edge and is substantially perpendicular to the faces 4*e* of the membrane (including when the membrane is in undulatory movement). Each longitudinal deflector 27*a* can limit the risk of having fluid streams deviating laterally from a corresponding membrane edge.

The On-Board Converters

As shown in FIGS. 20 and 21, the device may include on-board converters 16*a*, 16*b* on the membrane 4. These converters 16*a*, 16*b* are placed at a distance from said support 3. These converters 16*a*, 16*b* transform mechanical energy of deformation of the membrane into electrical energy.

Two types 16*a*, 16*b* of on-board converters on the membrane are envisaged.

A first type 16*a*, shown in FIG. 20, includes a group of permanent magnets 16*a*2 and a group of coils 16*a*1. At least some of the coils of the group of coils 16*a*1 are connected mechanically to the membrane, and at least some of the magnets of the group of magnets 16a2 are connected mechanically to the membrane 4.

These mechanical connections of magnets and coils to the membrane 4 are adapted so that, during a deformation of the membrane, the movement of the first and second areas 6, 8 toward or away from each other causes some coils of the group of coils 16a1 to be translated relative to magnets of the group of magnets 16a2 so as to induce an electric current in at least some of these coils.

It should be noted that at least some of the magnets and/or coils may form movable weights fixed to the membrane 4.

A second type 16b of on-board converter is visible in the embodiment of FIG. 21. This drawing shows a group of rotary generators 16b of electric current on board the membrane 4. Each rotary generator has two arms 16b1 mounted rotatably with respect to each other about a natural axis 16b2 of the rotary generator. Each rotary generator is adapted to generate electric current when its arms 16b1 are pivoted with respect to each other about the axis 16b2.

Preferably, each rotary generator of the group is arranged in such a way that its arms 16b1 are attached to the membrane 4 and its natural generator axis 16b2 is perpendicular to the longitudinal sectional plane P of the membrane. In other words, the natural axes 16b2 of the rotary generators on board the membrane are parallel to the upstream 4c and downstream 4d edges of the membrane 4.

In the embodiment of FIG. 21, the arms of at least some of the rotary generators are interconnected so as to form an articulated chain of on-board rotary generators carried by the membrane. This articulated chain of on-board generators is deformed according to the undulations of the membrane. This chain of on-board rotary generators generates electrical energy as soon as the membrane undulates under the effect of the fluid flow.

It should be noted that the invention may also relate to an energy recovery device including a membrane connected in a first area to a support via attachment means and connected in a second area to a transmission means which is on board the membrane, in which case this transmission means connects the second area to at least one on-board converter of one of the types defined above, this device further including separation limiting means such as those defined above.

Although not shown in the drawings, the distance limiting means may also be integrated with the on-board linear or rotary generators.

In this embodiment, the transmission of forces captured in the second area takes place via a means on board the membrane, the converter also being on board the membrane, as in the case of the embodiments of FIGS. 20 and 21.

Device with Two Membranes which are Symmetrical about an Axis of Oscillation

As can be seen in the embodiment shown in FIG. 12, the attachment system 5 may have a first assembly 30 and a second assembly 31. These assemblies 30 and 31 are connected rigidly to each other and mounted rotatably with respect to a support axis B-B extending between these assemblies 30 and 31.

A first flexible membrane 4a is attached to the first assembly 30 in a first area of the membrane, according to at least one of the modes of membrane attachment described above.

A second flexible membrane 4b is attached to the second assembly 31 in a first area of this second membrane 4b, according to at least one of the modes of membrane attachment described above.

The device of this FIG. 12 includes a transmission means including a downstream bar 13b extending perpendicularly to the axis B-B. This bar 13b is mounted rotatably about this axis B-B. The membrane 4a includes a second area attached to the portion of the bar 13b extending on one side of the axis B-B. The membrane 4b also includes a second area attached to the portion of the bar 13b extending on the other side of the axis B-B. Each of these portions of the downstream bar 13b may be mounted pivotably with respect to the axis B-B about a pivot axis C-C extending along the bar 13b. This axis C-C is perpendicular to the axis B-B. Thus, each portion of the downstream bar can pivot about the axis C-C independently of the pivoting of the other portion of the bar 13b about the axis C-C.

This device of FIG. 12 also includes means for limiting the separation of the first and second areas of the two membranes 4a, 4b. For example, these separation limiting means may consist of a stop which sets the distance D of the downstream bar 13b of the transmission means with respect to the upstream bar 13a of the attachment system in such a way that it is less than the length L of each of the membranes (these membranes 4a and 4b being identical to each other, in other words having the same dimensions of length, width and thickness, and being formed from the same material).

This device also has a converter connected to the upstream and downstream bars 13a, 13b in such a way that, when these bars move in rotation with respect to each other by rotation about the axis B-B, this generator produces electricity.

Because these membranes 4a, 4b are interconnected upstream via the bar 13a of the attachment system and downstream via the bar 13b of the transmission means 12, each membrane can be forced to have a natural undulation which is out of phase with the natural undulation of the other membrane. Since each of these membranes undulates with the fluid flow (because its length L is greater than the minimum distance D) while having a wave which is out of phase with the wave of the other membrane, it is found that the downstream bar 13b oscillates in rotation about the axis B-B with respect to the upstream bar 13a. When these bars oscillate with respect to each other, the converter 14 generates electrical energy.

The invention is not limited to the embodiments described above and may also include embodiments in which the limiting means include small connecting members mounted in series and hinged together in place of cables. However, it has been found that the energy capture performance of the device is improved if cables are used as separation limiting means.

It should also be noted that the energy recovery means arranged to recover energy from undulatory movements of the membrane may include:

one or more energy converters 14 such as those described above; and/or one or more on-board converters such as those 16a, 16b described above; and/or one or more on-board converters on the membrane formed by an electroactive polymer structure, this polymer being arranged to produce electricity when it undergoes mechanical deformation as a result of the deformation of the membrane (ideally, the whole membrane is made of electroactive polymer).

In order to improve the longitudinal bending stiffness characteristics of the membrane while preventing it from twisting excessively between its upstream and downstream areas, it is also possible to fit the membrane with stiffeners arranged diagonally on the membrane.

As shown in FIGS. 1, 25a, 25b and 26, resilient stiffeners R can be installed to oppose resiliently the movement of the first area 6 of the membrane 4 on either side of a position (for example, a central position of this first area which is assumed when the membrane is at rest). These resilient stiffeners Rare connected to the first membrane area 6 and to the support 3 so as to force the first area 6 to return to its central position. A stiffener R of this type opposes the movement of the upstream edge of the membrane along an axis of movement perpendicular to the plane in which the upstream and downstream edges of this membrane extend when at rest.

Finally, it should be noted that this stiffener R may be provided by using a link 5a of the support 3 in the first area 6 which is resilient in transverse bending with respect to the flow.

The invention claimed is:

1. A device for recovering energy from a flow of fluid, including:
   a support;
   a flexible membrane;
   an attachment system for attaching at least a first area of the membrane, connecting this first area of the membrane to the support;
   an energy converter;
   force transmission means connected to a second area of the membrane remote from the first area of the membrane, this second area of the membrane being movable with respect to the support, and these force transmission means being arranged to transmit mechanical energy from the second area toward the energy converter,
   wherein the flexible membrane is made of a flexible plate of elastomer, the flexible membrane having a longitudinal stiffness opposing its bending between its first and second areas,
   wherein the device includes separation limiting means, adapted to limit the separation of the first area of the membrane from at least a first point of the attachment system and to limit the separation of the second area of the membrane from a second point of the attachment system, these separation limiting means being such that the first and second areas are spaced apart from each other by a minimum distance smaller than the shortest length separating these first and second areas measured along a face of the membrane, these separation limiting means thus promoting an undulatory movement of the membrane when the latter is placed in said fluid flow, and
   wherein at least one of these separation limiting means is a first flexible cable having one of its ends connected to the attachment system and another of its ends connected to the second area of the membrane.

2. The device as claimed in claim 1, wherein said longitudinal elastic stiffness is such that the membrane has resistance to bending about bending axes extending perpendicularly to a longitudinal sectional plane of the membrane passing through the first and second areas of the membrane.

3. The device as claimed in claim 1, wherein the separation limiting means are such that the first and second areas are spaced apart from each other by a minimum distance of less than 95% of the shortest length separating these first and second areas measured along said face of the membrane.

4. The device as claimed in claim 1, wherein the energy converter connected to the force transmission means is also connected to the support and is adapted to generate energy, such as electrical energy, from a relative movement of the force transmission means with respect to the support.

5. The device as claimed in claim 4, wherein the energy converter includes:
   means for generating a force of resistance to the movement of the transmission means with respect to the support; and
   means for controlling the variation of this resistive force.

6. The device as claimed in claim 5, wherein the membrane is chosen in such a way that, when the device is immersed in a flow of water having a flow velocity in the range from 0.3 to 5 meters per second, the membrane as seen in longitudinal section has a half-undulation between intermediate points of the membrane which are adjacent to each other.

7. The device as claimed in claim 5, wherein the membrane is chosen in such a way that, when the device is immersed in a flow of water having a flow velocity in the range from 0.3 to 5 meters per second, the membrane as seen in longitudinal section has one complete undulation between intermediate points of the membrane which are adjacent to each other.

8. The device as claimed in claim 1, wherein at least some of the separation limiting means are connected to a plurality of intermediate points of attachment to the membrane, located between the first and second areas of the membrane, these separation limiting means which are connected to the intermediate points also being:
   adapted to limit the separation of each of these intermediate points with respect to at least one point on the attachment system,
   adapted to allow the movement of these intermediate points with respect to the support, and
   adapted to limit the separation of at least some of these intermediate points from each other, in such a way that the membrane always has a length, measured along said face of the membrane and between two of these intermediate points, which is always greater than the distance separating these two intermediate points.

9. The device as claimed in claim 1, wherein:
   at least some of the separation limiting means are resilient and form at least one pair of separation limiting means, each having a natural stiffness,
   a first limiting means of this pair being connected to the membrane at a first location between its first and second areas;
   a second limiting means of this pair being connected to the membrane at a second location between the first location and the second area of the membrane; and
   the natural stiffness of the first of the limiting means of this pair being greater than the natural stiffness of the second of the limiting means of this pair.

10. The device as claimed in claim 1, further including:
    a head deflector connected to the membrane in a rigid fashion and located between the attachment system and the first area of the membrane, and/or
    a tail deflector connected in a rigid fashion to one end of the membrane and extending beyond the second membrane area.

11. The device as claimed in claim 1, including at least one longitudinal reinforcer extending along the membrane between the first and second areas of the membrane, this reinforcer being adapted to increase the resistance of the membrane to bending about a bending axis extending perpendicularly to a longitudinal sectional plane of the membrane passing through its first and second areas.

12. The device as claimed in claim 1, wherein the device includes transverse reinforcers extending along a face of this membrane and perpendicularly to a longitudinal sectional plane of the membrane passing through the first and second areas, these transverse reinforcers being adapted to increase the resistance of the membrane to bending about a longitudinal bending axis passing through the first and second areas of the membrane.

13. The device as claimed in claim 1, including means for positioning the device in its environment, these positioning means being:
    either buoyant and adapted to position the device in the flow by buoyancy in this flow;
    or ballasted and adapted to position the device on a ground which limits the flow, these positioning means being connected to said support by at least one hinge enabling the support to be oriented with respect to these positioning means.

14. The device as claimed in claim 1, including:
    longitudinal supporting deflectors, these longitudinal supporting deflectors being fixed to the support and extending, respectively, in planes parallel to each other and parallel to an axis passing through the first and second areas of the membrane, the membrane being arranged between these planes which contain the respective longitudinal supporting deflectors; and/or
    first and second transverse supporting deflectors, these transverse supporting deflectors being fixed to the support and extending in the same plane, the first transverse supporting deflector being parallel to a front edge of the membrane opposite the first membrane area, and the second transverse supporting deflector being parallel to a rear edge of the membrane opposite the second membrane area.

15. The device as claimed in claim 1, wherein the energy recovery means further include on-board converters on the membrane, placed at a distance from said support, these converters being adapted to transform the mechanical energy of deformation of the membrane into electrical energy.

16. The device as claimed in claim 1, wherein the longitudinal elastic stiffness of the membrane increases from the first area toward the second area of the membrane.

17. The device as claimed in claim 1, wherein said one end of the first flexible cable which is connected to the attachment system is connected to the attachment system via a point on the attachment system which is fixed with respect to the support.

18. The device as claimed in claim 1, wherein the separation limiting means include a second flexible cable having one of its ends connected to the attachment system and another of its ends connected to the second area of the membrane, said first and second flexible cables, when stretched, limiting said minimum distance so that said minimum distance is smaller than said shortest length separating the first and second areas of the membrane.

* * * * *